D. HORAN.
Pressure-Gage for Beer-Stills.
No. 226,614. Patented April 20, 1880.
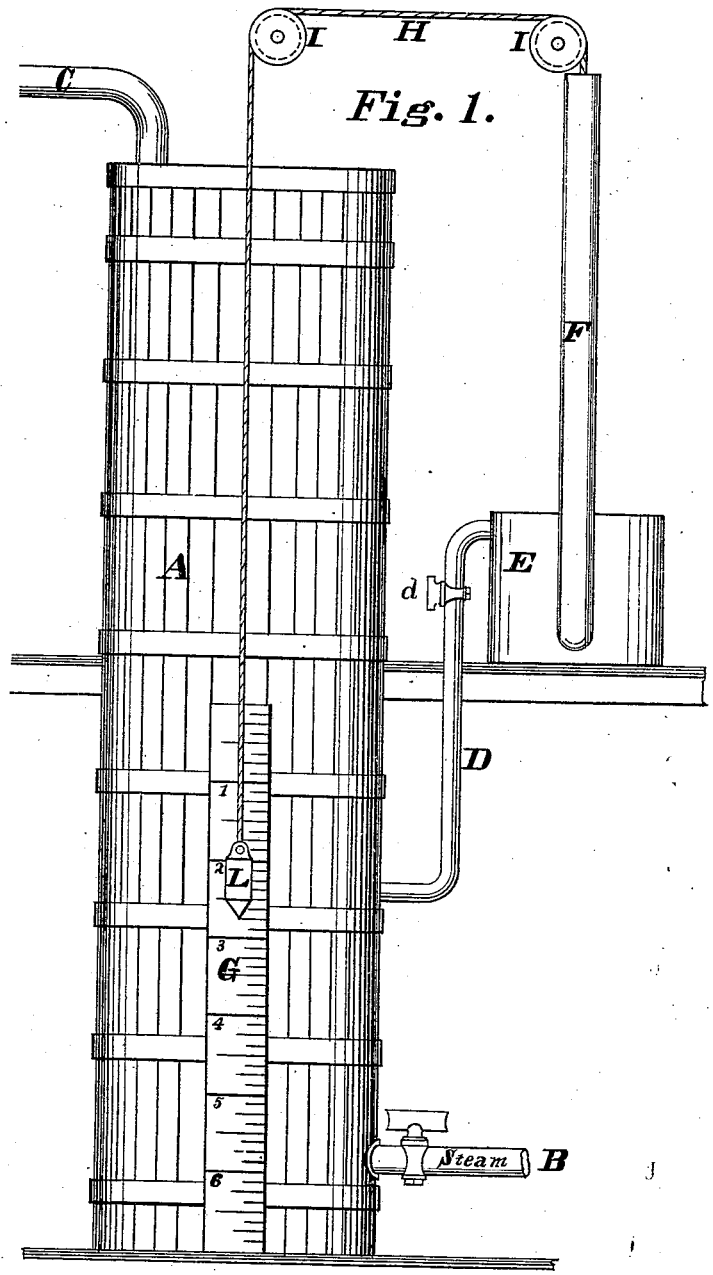
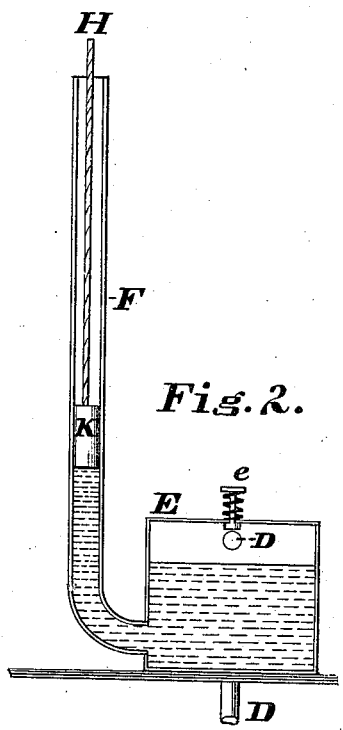
Attest
Collin Ford Jr.
Edgar J. Gross
Inventor.
Daniel Horan
By John W. Hill
Attorney

UNITED STATES PATENT OFFICE.

DANIEL HORAN, OF CINCINNATI, OHIO.

PRESSURE-GAGE FOR BEER-STILLS.

SPECIFICATION forming part of Letters Patent No. 226,614, dated April 20, 1880.

Application filed February 10, 1880.

*To all whom it may concern:*

Be it known that I, DANIEL HORAN, of Cincinnati, in the county of Hamilton and State of Ohio, have invented certain new and useful Improvements in Pressure-Gages for Beer-Stills, of which the following is a specification.

My invention is in the nature of an improvement in gages for indicating low pressures, and particularly for indicating steam-pressures in beer-stills; and it consists in utilizing for this purpose the well-known hydrostatic column.

To accomplish this I lead from the side of the beer-still a small pipe, which I connect to the top of a small tank containing water or other suitable fluid, upon the upper surface of which the pressure of the steam is made to act. To the tank, at or near the bottom, I attach a small pipe, which rises vertically upward several feet above the top of the tank, and into which is dropped a metal float. To an eye in the float I attach a cord or light chain, which is passed over suitable guide-pulleys, and is furnished at the opposite end with a counterpoise or index-plate. Behind the index-plate I place a vertical scale graduated in pounds and divisions of a pound. The weight or index-plate travels vertically up and down before the scale, and by its position on the scale indicates the pressure on the still. Any change in the pressure on the still is accompanied by a corresponding change in the altitude of the column of water in the rising-pipe containing the float, and by a corresponding rise and fall of the float and the index-plate.

In the accompanying drawings, Figure 1 represents a beer-still with my improved pressure-gage connected thereto, and Fig. 2 is a detached view of the water-tank and rising-pipe.

Similar letters of reference indicate similar parts.

A is a beer-still of any desired construction, with a steam-entry pipe, B, and a steam-exit pipe, C. D is a pipe of small diameter, attached to the side of the still at any convenient point and provided with a stop-cock, *d*.

E is the water-tank, partially filled with water or any convenient and suitable liquid. To the side of the tank, above the water-line, the pipe D is connected, as shown in Fig. 2.

F is the vertical rising-pipe, connected at its lower end to the tank E, near the bottom thereof. H is the cord; I I, the guide-rollers, (which are preferably grooved, as shown.) K is the float; L, the counterpoise or index-plate, and G is the vertical scale, (graduated in pounds and divisions of a pound,) usually secured to the side of the still.

The pressure in the still A and water-tank E being alike, the water is forced out of the tank and up the rising-pipe F until the column of water measured from the surface of the water in the tank just balances the steam-pressure in the tank D and still A. The position of the float, of course, corresponds with the rise and fall of the column of water in the pipe F. The float K and index-plate L are so connected that a rise of one inch of the float is accompanied by a corresponding fall or descent of the index-plate.

The steam-pressures used in beer-stills for making high wines rarely exceed five or six pounds, and the yield of high wines depends largely upon maintaining a uniform steam-pressure in the still. Hence it becomes necessary that a gage be used to indicate the pressures that will be sensitive to the slightest variations in the pressure. Thus a rise or fall of twenty-seven inches in the column of water in the pipe F indicates a corresponding change in the steam-pressure on the still of one pound, and the rise and fall of the column of water one-quarter of an inch indicates a corresponding variation in the steam-pressure on the still of less than one-hundredth of a pound, from which it will be seen that the slightest change in the steam-pressure is accompanied by a considerable change in the position of the index-plate on the scale G.

It will be observed that the area of the tank E is relatively large compared with the area of the pipe F, and that a very small displacement or increase of the water in the tank will produce a very large increase or diminution of the column of water in the pipe F.

Should the stop-cock in the steam-pipe B be closed and the steam in the still and the upper part of the tank E be condensed, the tank and still would be liable to collapse under the atmospheric pressure.

To avoid an injury of this kind I provide on the top of the tank E an inwardly-opening valve, e, held in place partly by the steam-pressure within the tank and partly by the upward thrust of a weak coiled spring. Directly the steam within the tank and the still condenses the pressure of the atmosphere on the upper surface of the valve forces the valve inward and equalizes the atmospheric pressure within and without the still and the tank.

The length or height of the rising pipe F is made only sufficient to furnish the maximum pressure allowed on the still.

A pressure-gage constructed as herein shown not only indicates the variations of pressure on the still, but serves as a perfect safety-valve to prevent overpressure on the still; for, should the steam-pressure exceed the pressure due a column of water of the same height as the pipe F, the float and water will be instantly blown out of the pipe and the pressure on the still relieved.

Although my invention is specially useful on beer-stills for the manufacture of high wines, I do not wish to limit it to this purpose, as it will answer equally as well in many cases where low pressures of steam or gases are employed, and where it is desirable to indicate accurately slight variations in the pressures.

Having described my invention, what I claim is—

A gage for low-pressures, consisting, essentially, of the water-tank E, steam-pipe D, water-pipe F, float K, chain or cord H, guide-pulleys I I, index-plate L, and graduated scale G, substantially as shown and described.

In testimony whereof I have signed my name to the foregoing specification in the presence of two subscribing witnesses.

DANIEL HORAN.

Witnesses:
COLLIN FORD, Jr.,
JOHN W. HILL.